United States Patent
Moussy et al.

(10) Patent No.: US 12,472,164 B2
(45) Date of Patent: Nov. 18, 2025

(54) MASITINIB FOR THE TREATMENT OF SICKLE CELL DISEASE

(71) Applicants: AB SCIENCE, Paris (FR); UNIVERSITÉ PARIS CITÉ, Paris (FR); ASSISTANCE PUBLIQUE HOPITAUX DE PARIS, Paris (FR); INSTITUT NATIONAL DE LA SANTE ET DE LA RECHERCHE MEDICALE, Paris (FR); IMAGINE INSTITUT DES MALADIES GENETIQUES NECKER ENFANTS MALADES, Paris (FR)

(72) Inventors: Alain Moussy, Paris (FR); Jean-Pierre Kinet, Lexington, MA (US); Olivier Hermine, Paris (FR); Thiago Trovati Maciel, Villeneuve-le-Roi (FR); Slimane Allali, Meudon (FR); Rachel Rignault-Bricard, Choisy-le-Roi (FR); Caroline Carvalho, Emerainville (FR)

(73) Assignees: AB SCIENCE, Paris (FR); UNIVERSITÉ PARIS CITÉ, Paris (FR); ASSISTANCE PUBLIQUE HOPITAUX DE PARIS, Paris (FR); INSTITUT NATIONAL DE LA SANTE ET DE LA RECHERCHE MEDICALE, Paris (FR); IMAGINE INSTITUT DES MALADIES GENETIQUES NECKER ENFANTS MALADES, Paris (FR)

( * ) Notice: Subject to any disclaimer, the term of this patent is extended or adjusted under 35 U.S.C. 154(b) by 671 days.

(21) Appl. No.: 17/778,588

(22) PCT Filed: Nov. 20, 2020

(86) PCT No.: PCT/EP2020/082981
§ 371 (c)(1),
(2) Date: May 20, 2022

(87) PCT Pub. No.: WO2021/099616
PCT Pub. Date: May 27, 2021

(65) Prior Publication Data
US 2023/0000838 A1    Jan. 5, 2023

(30) Foreign Application Priority Data
Nov. 22, 2019    (EP) .................................... 19306514

(51) Int. Cl.
  *A61K 31/426*    (2006.01)
  *A61K 31/496*    (2006.01)
  *A61P 7/00*    (2006.01)
(52) U.S. Cl.
  CPC .......... *A61K 31/426* (2013.01); *A61K 31/496* (2013.01); *A61P 7/00* (2018.01)

(58) Field of Classification Search
  CPC ................................ A61K 31/426; A61P 7/00
  See application file for complete search history.

(56) References Cited

U.S. PATENT DOCUMENTS 7,423,055 B2    9/2008    Ciufolini et al.

FOREIGN PATENT DOCUMENTS

| | | | |
|---|---|---|---|
| EP | 1525200 B1 | 10/2007 | |
| EP | 4061371 B1 * | 2/2025 | ........... A61K 31/426 |
| WO | 2008083098 A1 | 7/2008 | |
| WO | 2008098949 A2 | 8/2008 | |
| WO | 2008098985 A2 | 8/2008 | |
| WO | 2012104402 A1 | 8/2012 | |
| WO | 2015077763 A1 | 5/2015 | |
| WO | 2015143012 A1 | 9/2015 | |
| WO | 2016168444 A1 | 10/2016 | |
| WO | 2017048702 A1 | 3/2017 | |
| WO | 2017087607 A1 | 5/2017 | |
| WO | 2018204764 A1 | 11/2018 | |

OTHER PUBLICATIONS

Dubreuil et al. PLOS ONE, Sep. 2009, vol. 4, No. 9, e7258, p. 1-12 (Year: 2009).*
International Search Report and Written Opinion issued on Feb. 17, 2021 in corresponding International Patent Application No. PCT/EP2020/082981; 11 pages.
Wu et al., "Correction of sickle cell disease by homologous recombination in embryonic stem cells", Blood, Aug. 15, 2006, vol. 108, No. 4, pp. 1183-1188, doi: 10.1182/blood-2006-02-004812.
Nguyen et al., "Phenotypic Characterization the Townes Sickle Mice", Blood, Dec. 6, 2014, vol. 124, No. 21, 4 pages, doi.org/10.1182/blood.V124.21.4916.4916.
Afrin, "Mast Cell Activation Syndrome as a Significant Comorbidity in Sickle Cell Disease", The American Journal of the Medical Sciences, Dec. 2014, vol. 348, No. 6, pp. 460-464, doi: 10.1097/MAJ.0000000000000325.
Bartolucci et al., "Score Predicting Acute Chest Syndrome During Vaso-occlusive Crises in Adult Sickle-cell Disease Patients", EBioMedicine, Jun. 29, 2016, vol. 10, pp. 305-311, doi: 10.1016/j.ebiom.2016.06.038.
Conran et al., "Inflammation in Sickle Cell Disease", Clinical Hemorheology and Microcirculation, 2018, vol. 68, Nos. 2-3, 46 pages, doi: 10.3233/CH-189012.

(Continued)

Primary Examiner — James D. Anderson
(74) Attorney, Agent, or Firm — Maier and Maier, PLLC

(57) ABSTRACT

A 2-aminoarylthiazole derivative or a pharmaceutically acceptable salt or solvate thereof, in particular masitinib or a pharmaceutically acceptable salt or solvate thereof, for use in the treatment of sickle cell disease in a patient in need thereof. Also, a 2-aminoarylthiazole derivative or a pharmaceutically acceptable salt or solvate thereof, in particular masitinib or a pharmaceutically acceptable salt or solvate thereof, for use in the prevention and/or treatment of acute chest syndrome (ACS) in a sickle cell disease patient in need thereof.

17 Claims, 2 Drawing Sheets

(56) References Cited

OTHER PUBLICATIONS

Murphy et al., "Effectiveness of imatinib therapy for Sickle Cell Anemia and Chronic Myeloid Leukemia", The American Journal of the Medical Sciences, Mar. 2014, vol. 347, No. 3, 2 pages, doi: 10.1097/MAJ.0000000000000228.
Owusu-Ansah et al., "Inflammatory targets of therapy in sickle cell disease", Translational Research, Jan. 2016, vol. 167, No. 1, 29 pages, doi: 10.1016/j.trsl.2015.07.001.
Stankovic et al., "Chronic myeloid leukaemia and sickle cell disease: could imatinib prevent vaso-occlusive crisis?", British Journal of Haematology, Apr. 13, 2011, vol. 155, No. 2, pp. 271-272, doi: 10.1111/j.1365-2141.2011.08670.
Vincent et al., "Mast cell activation contributes to sickle cell pathobiology and pain in mice", Blood, Sep. 12, 2013, vol. 122, No. 11, pp. 1853-1862, doi: 10.1182/blood-2013-04-498105.
Vincent et al., "Cannabinoid receptor-specific mechanisms to alleviate pain in sickle cell anemia via inhibition of mast cell activation and neurogenic inflammation", Haematologica, May 2016, vol. 101, No. 5, pp. 566-577, doi: 10.3324/haematol.2015.136523.

\* cited by examiner

WT

WT

SCD

SCD

SCD VOC

SCD VOC

SCD Masitinib

SCD Masitinib

MASITINIB FOR THE TREATMENT OF SICKLE CELL DISEASE

FIELD

The present invention relates to the treatment of sickle cell disease (SCD) in a patient in need thereof, and in particular to the prevention and/or treatment of acute chest syndrome (ACS) in a sickle cell disease patient in need thereof.

BACKGROUND

Sickle cell disease (SCD) encompasses autosomal recessive genetic blood disorders characterized by the presence of the hemoglobin variant hemoglobin S (also referred to as HbS). Patients suffering from sickle cell disease possess either two alleles of the β-globin gene with the mutation resulting in HbS (single substitution A to T in the codon for amino acid 6 of β-globin), one allele of the β-globin gene with the mutation resulting in HbS and the other allele with a mutation resulting in another hemoglobin variant (such as HbC, HbD, HbE or HbO), or one allele of the β-globin gene with the mutation resulting in HbS and the other allele with a mutation resulting in the partial or total loss of β-globin ($Hb\beta^+$ or $Hb\beta^0$, respectively).

Depending on their genotype, sickle cell disease patients exhibit symptoms of varying severity, with the most affected patients being patients HbSHbS (also referred as HbSS or SS in short) or $HbSHb\beta^0$ (also referred to as $HbS\beta^0$ or $S\beta^0$ in short). In patients with HbSHbS, sickle cell disease is also referred to as sickle cell anemia or hemoglobin SS disease. In patients with HbSHbβ (i.e., either $Hb\beta^+$ or $Hb\beta^0$), sickle cell disease is also referred to as HbSHbβ thalassemia, sickle beta thalassemia, or hemoglobin Sβ disease.

The HbS hemoglobin variant forms polymers under conditions of low oxygen tension, which result in the presence of stiff rods within the red blood cells. The red blood cells are thus deformed and acquire a crescent, or sickle, shape. Sickle-shaped red blood cells are more rigid and sticky, compared to normal red blood cells, and this may cause a blockage that slows, or stops the flow of blood, and thus obstructs the microcirculation in a vaso-occlusive episode, also referred to as vaso-occlusive crisis (VOC) or acute painful crisis. Vaso-occlusive crises result in oxygen deprivation in the affected tissues and organs which may cause pain, stroke, leg ulcers, spontaneous abortion and renal insufficiency.

Other symptoms or complications of sickle cell disease include chronic anemia, acute chest syndrome, splenic and/or renal dysfunction, aplastic crisis, splenic sequestration crisis, hyperhemolytic crisis, hepatic crisis, dactylitis and susceptibility to bacterial infections. Acute chest syndrome (ACS) is characterized by chest pain, fever, respiratory symptoms, and/or pulmonary infiltrates. ACS is caused by an initial insult or inciting event, such as, for example, a pulmonary infection, bone marrow or fat embolism, and/or pulmonary infarction, which causes a fall in alveolar oxygenation tension, which in sickle cell disease patients causes HbS polymerization. This, in turn, leads to decreased pulmonary blood flow resulting in further vaso-occlusion and tissue hypoxia. In patients with sickle cell disease, ACS may develop during a vaso-occlusive crisis or as a single event unrelated to a vaso-occlusive crisis. Patients with sickle cell disease may also suffer from a sickle cell crisis (SCC) defined as the presence of at least one complication, including in particular, without being limited to, vaso-occlusive crisis, aplastic crisis, splenic sequestration crisis, hyperhemolytic crisis, hepatic crisis, dactylitis, and acute chest syndrome. During a sickle cell crisis, each of the complication may occur independently or concurrently.

Currently, the only cure for sickle cell disease are stem cell or bone marrow transplants. However, considering the associated risks, the difficulty to find good matches and the costs, such transplants are not frequently carried out. The management of sickle cell disease mainly aims at preventing and managing painful vaso-occlusive crises and includes preventive measures (such as, for example, high fluid intake, avoidance of extreme temperatures, avoidance of high altitudes, avoidance of very strenuous exercise), chronic blood transfusion and pain medications.

The only commonly available treatment for sickle cell disease, aiming in particular at preventing vaso-occlusive crises, consists in the administration of hydroxyurea. Hydroxyurea induces the production of hemoglobin F which in turn reduces hemoglobin S polymerization and subsequent sickling. More recently, new treatments have been or are developed, including the administration of L-glutamine to prevent oxidative stress, the administration of crizanlizumab to prevent adhesion of the sickle red cells to the vessel surface, and the administration of voxelotor (also known as GBT-440 or GBT440) to prevent HbS polymerization.

To date, only hydroxyurea has been granted approval by both the FDA (US Food and Drug Administration) and the EMA (European Medicine Agency) for use in the treatment of sickle cell disease. However, hydroxyurea is not suitable for all SCD patients, and not all SCD patients treated with hydroxyurea will respond to the treatment. L-glutamine has been granted approval by the FDA but not by the EMA, which currently considers that it has not been shown that L-glutamine is effective at reducing the number of sickle cell crises or hospital visits. Crizanlizumab has recently been granted approval by the FDA, and a positive opinion has been issued by the EMA in July 2020, recommending a conditional marketing authorization.

Therefore, there is still a need for effective treatments for sickle cell disease, and in particular for treatments effective in preventing and/or treating acute chest syndrome in sickle cell disease patients.

As illustrated hereinafter, in a mouse model of sickle cell disease, the Applicant showed that a 2-aminoarylthiazole derivative such as masitinib is able to prevent vaso-occlusive crises and acute chest syndrome.

The present invention thus relates to a 2-aminoarylthiazole derivative, in particular a 2-aminoarylthiazole derivative of formula (II) as defined hereinafter, preferably masitinib, or a pharmaceutically acceptable salt or solvate thereof, for use in the treatment of sickle cell disease in a patient in need thereof.

SUMMARY

The present invention thus relates to a 2-aminoarylthiazole derivative, or a pharmaceutically acceptable salt or solvate thereof, for use in the treatment of sickle cell disease (SCD) in a patient in need thereof. In a preferred embodiment, the 2-aminoarylthiazole derivative has the formula (II):

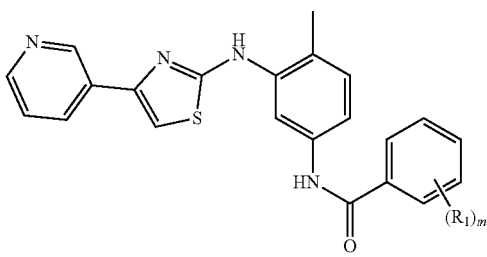

(II)

wherein:
R₁ is selected independently from hydrogen, halogen, (C₁-C₁₀) alkyl, (C₃-C₁₀) cycloalkyl group, trifluoromethyl, alkoxy, amino, alkylamino, dialkylamino, a solubilizing group, and (C₁-C₁₀) alkyl substituted by a solubilizing group; and
m is 0-5.

In one particular embodiment, the 2-aminoarylthiazole derivative, or a pharmaceutically acceptable salt or solvate thereof, is masitinib or a pharmaceutically acceptable salt or solvate thereof. In one embodiment, the pharmaceutically acceptable salt or solvate of masitinib is masitinib mesilate.

In one embodiment, the sickle cell disease is hemoglobin SS or hemoglobin Sβ⁰ disease. In one embodiment, the patient is a SCD patient with an increased risk of developing acute chest syndrome, preferably a SCD patient with at least one of the following: asthma, pulmonary hypertension, bronchial hyperreactivity, atopy, respiratory infection, reactive airway disease, exposure to morphine, active smoking, and/or chronic passive smoking (also referred to as environmental exposure smoking).

In one embodiment, the 2-aminoarylthiazole derivative, in particular masitinib, or a pharmaceutically acceptable salt or solvate thereof, is for use in the prevention and/or treatment of a sickle cell crisis (SCC), a vaso-occlusive crisis (VOC), and/or acute chest syndrome (ACS) in the SCD patient in need thereof. In one embodiment, the 2-aminoarylthiazole derivative, in particular masitinib, or a pharmaceutically acceptable salt or solvate thereof, is for use in the prevention and/or treatment of ACS in the SCD patient in need thereof. In one embodiment, ACS is unrelated to any other manifestation or complication of sickle cell disease.

In one embodiment, the 2-aminoarylthiazole derivative, in particular masitinib, or a pharmaceutically acceptable salt or solvate thereof, is for oral administration. In one embodiment, the 2-aminoarylthiazole derivative, in particular masitinib, or a pharmaceutically acceptable salt or solvate thereof, is for administration at a dose ranging from about 3 mg/kg/day to about 12 mg/kg/day. In one embodiment, the 2-aminoarylthiazole derivative, in particular masitinib, or a pharmaceutically acceptable salt or solvate thereof, is for administration at a dose of about 3 mg/kg/day, 4.5 mg/kg/day, or 6 mg/kg/day. In one embodiment, the 2-aminoarylthiazole derivative, in particular masitinib, or a pharmaceutically acceptable salt or solvate thereof, is for administration at an initial dose of about 3.0 mg/kg/day during at least 4 weeks, then at a dose of about 4.5 mg/kg/day during at least 4 weeks, and at a dose of about 6.0 mg/kg/day thereafter, with each dose escalation being subjected to toxicity controls.

In one embodiment, the 2-aminoarylthiazole derivative, in particular masitinib, or a pharmaceutically acceptable salt or solvate thereof, is for administration in combination with at least one further pharmaceutically active agent. In one embodiment the at least one further pharmaceutically active ingredient is selected from the group consisting of hydroxyurea (or hydroxycarbamide), erythropoietin, L-glutamine, crizanlizumab, rivipansel, ticagrelor, defibrotide, SC411, and voxelotor. In one embodiment, the at least one further pharmaceutically active agent is selected from the group consisting of hydroxyurea, erythropoietin, L-glutamine, and crizanlizumab. In one embodiment, the at least one further pharmaceutically active agent is hydroxyurea or erythropoietin.

DETAILED DESCRIPTION

Figure 1:
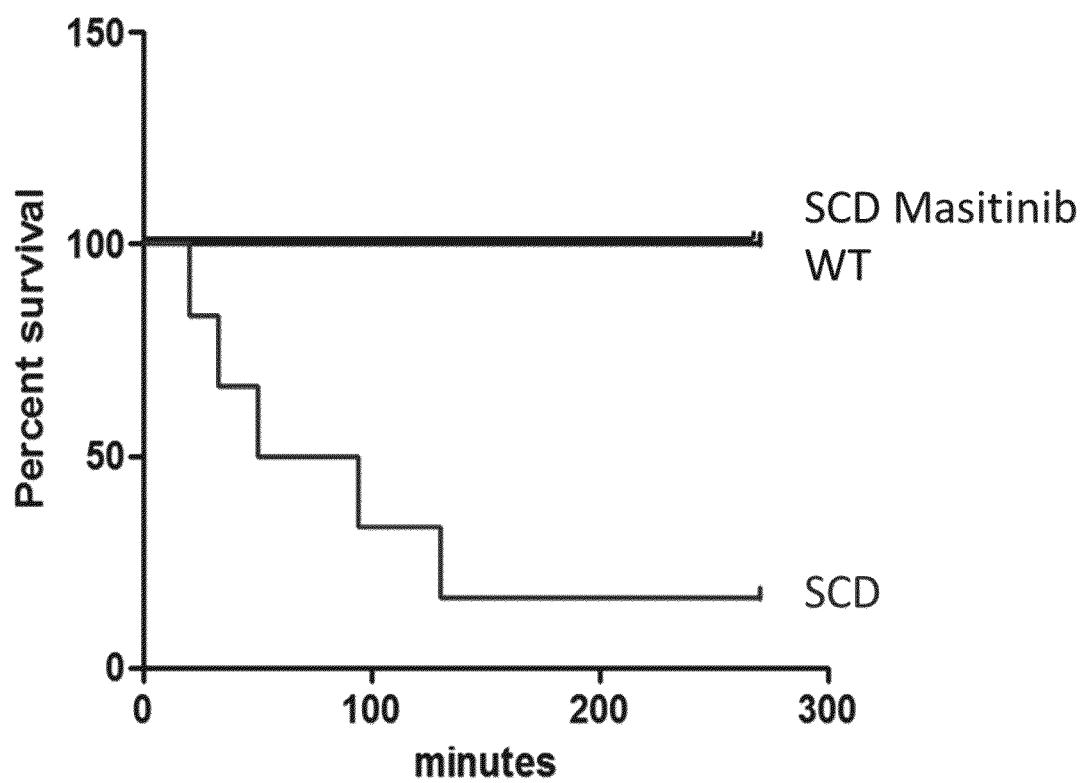
FIG. 1 is a graph showing the survival over time, following injection with substance P, of wild-type (WT) mice (WT—negative control group), untreated SCD mice (SCD—positive control group), and SCD mice pre-treated with masitinib at a dose of 100 mg/kg/day via gavage for 4 days prior to injection of substance P (SCD Masitinib). Time 0 is the time of injection of substance P.
Figure 2A:
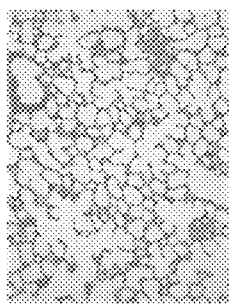
FIGS. 2A to 2H are histological images showing the lung tissue of wild-type (WT) mice (negative control group), untreated SCD mice (positive control group), and SCD mice pre-treated with masitinib (100 mg/kg/day via gavage for 4 days prior to injection of substance P), following injection with substance P. The lung tissue was processed immediately after death by cervical dislocation and fixed in 10% buffered formalin. 2A shows the lung tissue of a WT mouse stained with hematoxylin and eosin. 2B shows the lung tissue of a SCD mouse stained with hematoxylin and eosin. 2C shows the lung tissue of a SCD mouse which suffered a vaso-occlusive crisis (VOC) stained with hematoxylin and eosin. 2D shows the lung tissue of a SCD mouse which was treated with masitinib (100 mg/kg/day via gavage for 4 days prior to injection of substance P) stained with hematoxylin and eosin. 2E shows the lung tissue of a WT mouse stained with an anti-FcεRIα primary antibody and a fluorophore secondary antibody. 2F shows the lung tissue of a SCD mouse stained with an anti-FcεRIα primary antibody and a fluorophore secondary antibody. 2G shows the lung tissue of a SCD mouse which suffered a vaso-occlusive crisis (VOC) stained with an anti-FcεRIα primary antibody and a fluorophore secondary antibody. 2H shows the lung tissue of a SCD mouse which was treated with masitinib (100 mg/kg/day via gavage for 4 days prior to injection of substance P) stained with an anti-FcεRIα primary antibody and a fluorophore secondary antibody.
Figure 2E:
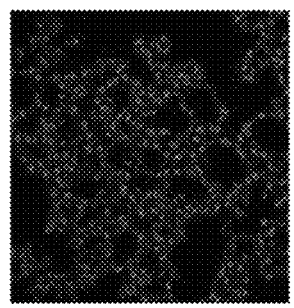
Figure 2B:
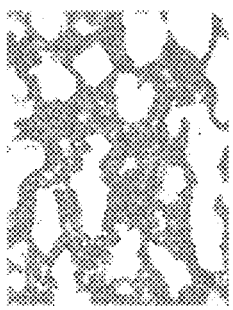
Figure 2F:
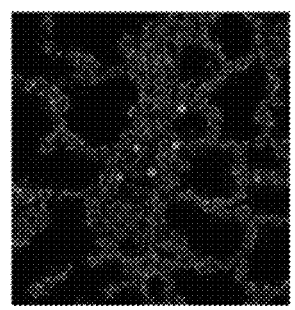
Figure 2C:
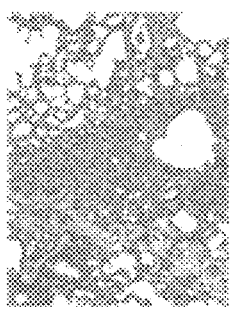
Figure 2G:
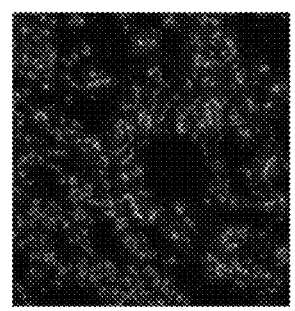
Figure 2D:
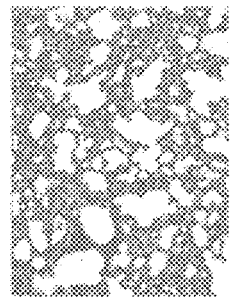
Figure 2H:
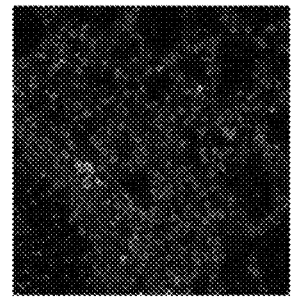

In the present invention, the following terms have the following meanings:

"About" preceding a figure encompasses plus or minus 10%, or less, of the value of said figure. It is to be understood that the value to which the term "about" refers is itself also specifically, and preferably, disclosed.

"Acute chest syndrome (ACS)" refers to a possible complication of sickle cell disease, characterized by chest pain, fever, respiratory symptoms, and/or pulmonary infiltrates. ACS is caused by an initial insult or inciting event, such as, for example, a pulmonary infection, bone marrow or fat embolism, and/or pulmonary infarction, which causes a fall in alveolar oxygenation tension, which in a SCD patient causes HbS polymerization. This, in turn, leads to decreased pulmonary blood flow resulting in further vaso-occlusion and tissue hypoxia. In a SCD patient, ACS may develop either during a vaso-occlusive crisis or as a single event unrelated to a vaso-occlusive crisis. In one embodiment, ACS is unrelated to a vaso-occlusive crisis. In one embodiment, ACS is unrelated to any other manifestation or complication of sickle cell disease.

"Hb" refers to the protein hemoglobin, which is a tetramer composed of four subunits (two pairs of identical subunits). The most commonly found hemoglobin in human adults is hemoglobin A (also referred to as HbA) composed of two chains α (α-globin) and of two chains β (β-globin). The α-globin chain (or hemoglobin α-subunit) is encoded by the HBA gene and the β-globin chain (or hemoglobin β-subunit) is encoded by the HBB gene. As mentioned hereinabove, there exists a number of hemoglobin variants, the majority of these being β-subunit variants. For example, the hemoglobin variant hemoglobin S results from a single mutation in the HBB gene which translates into a single amino acid substitution in the β subunit (change at position 6 of glutamic acid into valine).

"Patient" refers to a mammal, preferably a human. According to the present invention, a patient is a mammal, preferably a human, suffering from sickle cell disease and thus possessing hemoglobin variant(s), including at least one HbS, instead of hemoglobin HbA.

"Pharmaceutically acceptable excipient" or "pharmaceutically acceptable carrier" refers to an excipient or carrier that does not produce an adverse, allergic or other untoward reaction when administered to a mammal, preferably a human. It includes any and all solvents, such as, for example, dispersion media, coatings, antibacterial and antifungal agents, isotonic and absorption delaying agents. A pharmaceutically acceptable excipient or carrier refers to a non-toxic solid, semi-solid or liquid filler, diluent, encapsulating material or formulation auxiliary of any type. For human administration, preparations should meet sterility, pyrogenicity, general safety and purity standards as required by the regulatory offices such as the FDA or EMA.

"Prevention" refers to a prophylactic (or preventative) action, wherein the object is to reduce or slow down (lessen) one or more of the manifestations or complications of sickle cell disease in a patient in need thereof. In one particular embodiment, the object is to prevent sickle cell crisis (SCC), vaso-occlusive crisis (VOC) and/or acute chest syndrome (ACS). In one embodiment, the object of the prophylactic (or preventative) action is to bring about at least one of the following:
  decreasing the frequency and/or severity of sickle cell crises (SCCs);
  decreasing the frequency and/or severity of vaso-occlusive crises (VOCs);
  decreasing the frequency and/or severity of acute chest syndrome (ACS);
  decreasing the frequency of hospital visits and/or admissions, in other words, decreasing the frequency of hospitalization, in particular SCC-, VOC- and/or ACS-related hospitalization;
  shortening the length of hospital visits and/or stays, in other words, shortening the length of hospitalization, in particular SCC-, VOC- and/or ACS-related hospitalization.

"Sickle cell anemia" refers to a particular sickle cell disease wherein the patient possesses two alleles of the β-globin gene with the mutation resulting in the hemoglobin variant HbS (single substitution A to T in the codon for amino acid 6 of β-globin).

"Sickle cell crisis (SCC)" refers to a manifestation of sickle cell disease wherein the SCD patient suffers from at least one complication that may include, without being limited to, vaso-occlusive crisis (VOC), aplastic crisis, splenic sequestration crisis, hyperhemolytic crisis, hepatic crisis, dactylitis, and acute chest syndrome (ACS). During a sickle cell crisis, each of the complication may occur either independently or concurrently. In one embodiment, during a sickle cell crisis (SCC), the SCD patient suffers from at least one complication selected from the group comprising or consisting of vaso-occlusive crisis (VOC), aplastic crisis, splenic sequestration crisis, hyperhemolytic crisis, hepatic crisis, dactylitis, and acute chest syndrome (ACS). In one embodiment, during a sickle cell crisis (SCC), the SCD patient suffers from at least two complications selected from the group comprising or consisting of vaso-occlusive crisis (VOC), aplastic crisis, splenic sequestration crisis, hyperhemolytic crisis, hepatic crisis, dactylitis, and acute chest syndrome (ACS).

"Sickle cell disease (SCD)" refers to any autosomal recessive genetic blood disorders characterized by the presence of at least one allele of the β-globin gene with the single mutation resulting in the hemoglobin variant hemoglobin S. In one embodiment, sickle cell disease is characterized by the presence of two alleles of the β-globin gene with the mutation resulting in HbS, or one allele of the β-globin gene with the mutation resulting in HbS and another mutated allele of the β-globin gene.

"SCD patient" refers to a patient suffering from sickle cell disease as defined herein. In one embodiment, the SCD patient suffers or is susceptible to suffer from a sickle cell crisis (SCC). In one embodiment, the SCD patient suffers or is susceptible to suffer from a vaso-occlusive crisis (VOC). In one embodiment, the SCD patient suffers or is susceptible to suffer from acute chest syndrome (ACS).

"Therapeutically effective amount" or "therapeutically effective dose" refers to the amount or concentration of a 2-aminoarylthiazole derivative as defined herein, in particular masitinib, or a pharmaceutically acceptable salt or solvate thereof, that is aimed at, without causing significant negative or adverse side effects to the SCD patient, bringing about at least one of the following:
  delaying or preventing one or more of the manifestations or complications of sickle cell disease, in particular delaying or preventing sickle cell crises, vaso-occlusive crises and/or acute chest syndrome;
  reducing the severity or incidence of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections, and in particular of sickle cell crises, vaso-occlusive crises and/or acute chest syndrome;
  slowing down or stopping the progression, aggravation, or deterioration of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections;

decreasing the frequency of hospital visits and/or admissions, in other words, decreasing the frequency of hospitalization;

shortening the length of hospital visits and/or stays, in other words, shortening the length of hospitalization; and/or bringing about ameliorations of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections.

"Treating" or "Treatment" refers to a therapeutic treatment, wherein the object is to prevent, reduce or slow down (lessen) one or more of the manifestations or complications of sickle cell disease in a patient in need thereof. In one embodiment, "treating" or "treatment" refers to a therapeutic treatment, wherein the object is to bring about at least one of the following:

delaying or preventing one or more of the manifestations or complications of sickle cell disease, in particular delaying or preventing sickle cell crises, vaso-occlusive crises and/or acute chest syndrome;

reducing the severity or incidence of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections, and in particular of sickle cell crises, vaso-occlusive crises and/or acute chest syndrome;

slowing down or stopping the progression, aggravation, or deterioration of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections;

decreasing the frequency of hospital visits and/or admissions, in other words, decreasing the frequency of hospitalization;

shortening the length of hospital visits and/or stays, in other words, shortening the length of hospitalization; and/or bringing about improvement in one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections.

Accordingly, a SCD patient is considered as successfully "treated", if, after receiving a therapeutically effective amount of a 2-aminoarylthiazole derivative as defined herein, in particular masitinib, or a pharmaceutically acceptable salt or solvate thereof, the SCD patient benefits from at least one of the following:

a reduction in the severity or incidence of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections, and in particular of sickle cell crises, vaso-occlusive crises and/or acute chest syndrome;

a slowing down of or a halt in the progression, aggravation, or deterioration of one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections;

a decrease of the frequency of hospital visits and/or admissions, in other words, a decrease of the frequency of hospitalization;

a shortening of the length of hospital visits and/or stays, in other words, a shortening of the length of hospitalization; and/or an improvement in one or more of the manifestations or complications of sickle cell disease, such as pain, chronic anemia, splenic and/or renal dysfunction, aplastic crisis, splenic sequestration crisis, hyperhemolytic crisis, hepatic crisis, dactylitis, susceptibility to bacterial infections.

"Vaso-occlusive crisis (VOC)" or "acute pain crisis" refers to a manifestation of sickle cell disease, wherein sickle-shaped red blood cells cause a blockage that slows, or stops the flow of blood, and thus obstructs the microcirculation. VOC results in oxygen deprivation in the affected tissues and organs which may most frequently cause pain. Depending on the tissues and organs affected, VOC may cause stroke, leg ulcers, spontaneous abortion and renal insufficiency. VOC, in particular VOC resulting in significant pain, may require hospital visit and/or admission.

The present invention relates to a 2-aminoarylthiazole derivative, or a pharmaceutically acceptable salt or solvate thereof, for use in the treatment of sickle cell disease in a patient in need thereof. In a preferred embodiment, the 2-aminoarylthiazole derivative, or a pharmaceutically acceptable salt or solvate thereof, is a 2-aminoarylthiazole derivative of formula (II) as defined hereinafter, or a pharmaceutically acceptable salt or solvate thereof. In one particular embodiment, the 2-aminoarylthiazole derivative, or a pharmaceutically acceptable salt or solvate thereof, is masitinib, or a pharmaceutically acceptable salt or solvate thereof.

According to one embodiment, the term "sickle cell disease" encompasses any autosomal recessive genetic blood disorders characterized by the presence of at least one allele of the β-globin gene with the single mutation resulting in the hemoglobin variant hemoglobin S (also referred to as HbS).

In one embodiment, the SCD patient possesses either two alleles of the β-globin gene with the mutation resulting in HbS, or one allele of the β-globin gene with the mutation resulting in HbS and another mutated allele of the β-globin gene.

In one embodiment, said another mutated allele of the β-globin gene is an allele of the β-globin gene resulting in a variant other than HbS, such as HbC, HbD, HbE or HbO, or is an allele of the β-globin gene resulting in the partial or total loss of β-globin.

In one embodiment, the SCD patient possesses either two alleles of the β-globin gene with the mutation resulting in HbS, or one allele of the β-globin gene with the mutation resulting in HbS and one allele of the β-globin gene with a mutation resulting in the total loss of β-globin. Thus, in one embodiment, the sickle cell disease is hemoglobin SS or hemoglobin $S\beta^0$ disease (also referred to as HbSHbS and HbSHb$\beta^0$, respectively).

In one embodiment, the SCD patient possesses two alleles of the β-globin gene with the mutation resulting in HbS.

Thus, in one embodiment, the sickle cell disease is hemoglobin SS disease or HbSHbS (also referred to as sickle cell anemia).

In one embodiment, the SCD patient possesses one allele of the β-globin gene with the mutation resulting in HbS and one allele of the β-globin gene with a mutation resulting in the total loss of β-globin. Thus, in one embodiment, the sickle cell disease is hemoglobin Sβ° disease)(HbSHbβ°)

In one embodiment, the 2-aminoarylthiazole derivative or a pharmaceutically acceptable salt or solvate thereof as described hereinafter is for use in the prevention and/or treatment of a sickle cell crisis (SCC), a vaso-occlusive crisis (VOC) and/or acute chest syndrome (ACS) in a SCD patient in need thereof. Thus, in one embodiment, the 2-aminoarylthiazole derivative or a pharmaceutically acceptable salt or solvate thereof as described hereinafter is for use in the prevention, in the treatment, or in both the prevention and the treatment of a SCC, a VOC and/or ACS in a SCD patient in need thereof.

In one embodiment, the 2-aminoarylthiazole derivative or a pharmaceutically acceptable salt or solvate thereof as described hereinafter is for use in the prevention and/or treatment of a sickle cell crisis (SCC) in a SCD patient in need thereof. Thus, in one embodiment, the 2-aminoarylthiazole derivative or a pharmaceutically acceptable salt or solvate thereof as described hereinafter is for use in the prevention, in the treatment, or in both the prevention and the treatment of a SCC in a SCD patient in need thereof.

In one embodiment, a SCC is defined as the presence of at least one complication selected from the group comprising or consisting of VOC, aplastic crisis, splenic sequestration crisis, hyperhemolytic crisis, hepatic crisis, dactylitis, and ACS. In one embodiment, a SCC is defined as the presence of at least two complications selected from the group comprising or consisting of VOC, aplastic crisis, splenic sequestration crisis, hyperhemolytic crisis, hepatic crisis, dactylitis, and ACS.

In one embodiment, the 2-aminoarylthiazole derivative or a pharmaceutically acceptable salt or solvate thereof as described hereinafter is for use in the prevention and/or treatment of a vaso-occlusive crisis (VOC) in a SCD patient in need thereof. Thus, in one embodiment, the 2-aminoarylthiazole derivative or a pharmaceutically acceptable salt or solvate thereof as described hereinafter is for use in the prevention, in the treatment, or in both the prevention and the treatment of a VOC in a SCD patient in need thereof.

In one embodiment, a VOC manifests as pain, in particular acute pain, at one or several sites, such as the extremities, legs, arms, back, chest, and/or abdomen.

In one embodiment, the 2-aminoarylthiazole derivative or a pharmaceutically acceptable salt or solvate thereof as described hereinafter is for use in the prevention and/or treatment of acute chest syndrome (ACS) in a SCD patient in need thereof. Thus, in one embodiment, the 2-aminoarylthiazole derivative or a pharmaceutically acceptable salt or solvate thereof as described hereinafter is for use in the prevention, in the treatment, or in both the prevention and the treatment of ACS in a SCD patient in need thereof.

In one embodiment, ACS develops either during a vaso-occlusive crisis (VOC), or develops as a single event unrelated to a VOC, or develops as a single event unrelated to any other manifestation or complication of sickle cell disease. Thus, in one embodiment, the 2-aminoarylthiazole derivative or a pharmaceutically acceptable salt or solvate thereof as described hereinafter is for use in the prevention and/or treatment of ACS developed during a VOC, of ACS unrelated to a VOC, or of ACS unrelated to any other manifestation or complication of sickle cell disease, in a SCD patient in need thereof. In one embodiment, the 2-aminoarylthiazole derivative or a pharmaceutically acceptable salt or solvate thereof as described hereinafter is for use in the prevention, in the treatment, or in both the prevention and the treatment of ACS developed during a VOC, of ACS unrelated to a VOC, or of ACS unrelated to any other manifestation or complication of sickle cell disease, in a SCD patient in need thereof.

In one embodiment, the 2-aminoarylthiazole derivative or a pharmaceutically acceptable salt or solvate thereof as described hereinafter is for use in the prevention and/or treatment of ACS developed during a VOC. In one embodiment, the 2-aminoarylthiazole derivative or a pharmaceutically acceptable salt or solvate thereof as described hereinafter is for use in the prevention, in the treatment, or in both the prevention and the treatment of ACS developed during a VOC in a SCD patient in need thereof.

In one embodiment, the 2-aminoarylthiazole derivative or a pharmaceutically acceptable salt or solvate thereof as described hereinafter is for use in the prevention and/or treatment of ACS unrelated to a VOC in a SCD patient in need thereof. Thus, in one embodiment, the 2-aminoarylthiazole derivative or a pharmaceutically acceptable salt or solvate thereof as described hereinafter is for use in the prevention, in the treatment, or in both the prevention and the treatment of ACS unrelated to a VOC in a SCD patient in need thereof.

As used herein, ACS unrelated to a VOC refers to ACS occurring independently or susceptible to occur independently from a VOC in a SCD patient.

In one embodiment, ACS unrelated to a VOC refers to ACS occurring or susceptible to occur in a SCD patient who did not previously or recently suffer from a VOC.

In one embodiment, ACS unrelated to a VOC refers to ACS occurring or susceptible to occur in a SCD patient who did not suffer from a VOC in the at least 1, 2, 3, 4, or 5 preceding years. In one embodiment, ACS unrelated to a VOC refers to ACS occurring or susceptible to occur in a SCD patient who did not suffer from a VOC in the at least 3, 6, 9, 12, 15, 18, 21, 24, 27, 30, 33, or 36 preceding months. In one embodiment, ACS unrelated to a VOC refers to ACS occurring or susceptible to occur in a SCD patient who did not suffer from a VOC in the at least 2, 4, 6, 8, 10, 12, 14, 16, 18, 20, 22, 24, 26, 28, 30, 32, 34, 36, 38 or 40 preceding weeks.

In one embodiment, the 2-aminoarylthiazole derivative or a pharmaceutically acceptable salt or solvate thereof as described hereinafter is for use in the prevention and/or treatment of ACS unrelated to any other manifestation or complication of sickle cell disease. Thus, in one embodiment, the 2-aminoarylthiazole derivative or a pharmaceutically acceptable salt or solvate thereof as described hereinafter is for use in the prevention, in the treatment, or in both the prevention and the treatment of ACS unrelated to any other manifestation or complication of sickle cell disease.

In one embodiment, the manifestation or complication of sickle cell disease other than ACS is selected from the group comprising or consisting of VOC, aplastic crisis, splenic sequestration crisis, hyperhemolytic crisis, hepatic crisis, and dactylitis. In one embodiment, the manifestation or complication of sickle cell disease other than ACS is VOC, aplastic crisis, splenic sequestration crisis, hyperhemolytic crisis, hepatic crisis, or dactylitis.

As used herein, ACS unrelated to any other manifestation or complication of sickle cell disease refers to ACS occurring independently or susceptible to occur independently from any other manifestation or complication of sickle cell disease in a SCD patient.

In one embodiment, ACS unrelated to any other manifestation or complication of sickle cell disease refers to ACS occurring or susceptible to occur in a SCD patient who did not previously or recently suffer from any other manifestation or complication of sickle cell disease.

In one embodiment, ACS unrelated to any other manifestation or complication of sickle cell disease refers to ACS occurring or susceptible to occur in a SCD patient who did not suffer from any other manifestation or complication of sickle cell disease in the at least 1, 2, 3, 4, or 5 preceding years. In one embodiment, ACS unrelated to any other manifestation or complication of sickle cell disease refers to ACS occurring or susceptible to occur in a SCD patient who did not suffer from any other manifestation or complication of sickle cell disease in the at least 3, 6, 9, 12, 15, 18, 21, 24, 27, 30, 33, or 36 preceding months. In one embodiment, ACS unrelated to any other manifestation or complication of sickle cell disease refers to ACS occurring or susceptible to occur in a SCD patient who did not suffer from any other manifestation or complication of sickle cell disease in the at least 2, 4, 6, 8, 10, 12, 14, 16, 18, 20, 22, 24, 26, 28, 30, 32, 34, 36, 38 or 40 preceding weeks.

According to the present invention, the patient in need of treatment is a patient diagnosed with sickle cell disease (SCD), also referred to as a SCD patient.

In one embodiment, the SCD patient is a male. In another embodiment, the SCD patient is a female. In one embodiment, the SCD patient is an adult. According to the present invention, an adult is a patient above the age of 18, 19, 20 or 21 years. In another embodiment, the subject is a child. According to the present invention, a child is a patient below the age of 21, 20, 19 or 18 years.

In one embodiment, the SCD patient is a SCD patient with an increased risk of developing acute chest syndrome (ACS). Examples of factors associated in a SCD patient with an increased risk of developing ACS include, without being limited to, asthma, pulmonary hypertension, bronchial hyperreactivity, atopy, respiratory infections, reactive airway disease, exposure to morphine, active smoking, and chronic passive smoking (also referred to as environmental exposure smoking).

In one embodiment, a SCD patient with an increased risk of developing ACS is a SCD patient with at least one of the following: asthma, pulmonary hypertension, bronchial hyperreactivity, atopy, respiratory infection, reactive airway disease, exposure to morphine, active smoking, and chronic passive smoking (also referred to as environmental exposure smoking).

In one embodiment, the SCD patient previously suffered from at least one vaso-occlusive crisis (VOC). In one embodiment, the SCD patient previously suffered from at least one VOC in the last 1, 2, 4, 6, 8, 10, 12, 14, 16, 18, 20, 22, 24, 26, 28, 30, 32, 34, 36, 38 or 40 week(s). In one embodiment, the SCD patient previously suffered from at least one VOC in the last 6, 12, 18, 24, 30, 36, 42, 48, 54, or 60 weeks. In one embodiment, the SCD patient previously suffered from at least 2, 3 or more VOCs in the last 12, 18, 24, 30, 36, 42, 48, 54, or 60 weeks.

In one embodiment, the SCD patient previously suffered from at least one VOC requiring hospitalization. In one embodiment, the SCD patient previously suffered from at least one VOC requiring hospitalization in the last 1, 2, 4, 6, 8, 10, 12, 14, 16, 18, 20, 22, 24, 26, 28, 30, 32, 34, 36, 38 or 40 week(s). In one embodiment, the SCD patient previously suffered from at least one VOC requiring hospitalization in the last 6, 12, 18, 24, 30, 36, 42, 48, 54, or 60 weeks. In one embodiment, the SCD patient previously suffered from at least 2, 3 or more VOCs requiring hospitalization in the last 12, 18, 24, 30, 36, 42, 48, 54, or 60 weeks.

In one embodiment, the SCD patient previously suffered from at least one acute chest syndrome (ACS). In one embodiment, the SCD patient previously suffered from at least one ACS requiring hospitalization. In one embodiment, the SCD patient previously suffered from at least one ACS requiring at least one blood transfusion.

In one embodiment, the SCD patient previously suffered from at least one ACS in the last 1, 2, 3, 4, or 5 year(s). In one embodiment, the SCD patient previously suffered from at least one ACS requiring hospitalization in the last 1, 2, 3, 4, or 5 year(s). In one embodiment, the SCD patient previously suffered from at least one ACS requiring at least one blood transfusion in the last 1, 2, 3, 4, or 5 year(s)

In one embodiment, the SCD patient has a previous history of ischemic stroke. In one embodiment, the SCD patient does not have a previous history of ischemic stroke.

In one embodiment, the SCD patient has a previous history of arterial stenosis, in particular cerebral artery stenosis and/or carotid artery stenosis. In one embodiment, the SCD patient does not have a previous history of arterial stenosis, in particular cerebral artery stenosis and/or carotid artery stenosis.

In one embodiment, the SCD patient suffers from pulmonary hypertension, in particular pulmonary hypertension defined as a mean pulmonary artery pressure equal to or higher than 25 mmHg at rest. In one embodiment, the SCD patient does not suffer from pulmonary hypertension, in particular pulmonary hypertension defined as a mean pulmonary artery pressure equal to or higher than 25 mmHg at rest. Mean pulmonary artery pressure at rest may be determined, for example, by right heart catheterization.

In one embodiment, the SCD patient is receiving blood transfusion. In one embodiment, the SCD patient is receiving chronic blood transfusion, such as a blood transfusion once a month. In one embodiment, the SCD patient is not receiving blood transfusion.

In one embodiment, the SCD patient is refractory or resistant to conventional therapy, in particular the patient is refractory or resistant to treatment with hydroxyurea.

In the present invention, a 2-aminoarylthiazole derivative refers to a compound characterized by the presence of a thiazolyl group substituted on position 2 (i.e., between the heterocyclic nitrogen and sulfur atoms) by a secondary or tertiary amine, wherein the nitrogen atom of the amine is substituted by at least one aryl group.

According to one embodiment, the aryl group is substituted by an arylamide group (i.e., —NH—CO-aryl).

In one embodiment, the 2-aminoarylthiazole derivative of the invention has the following formula (I):

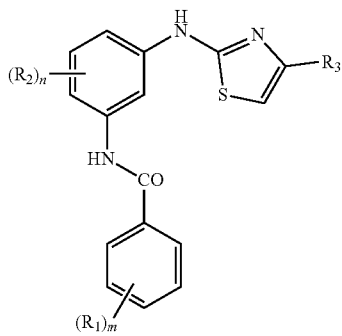

(I)

wherein:
$R_1$ and $R_2$ are selected independently from hydrogen, halogen, $(C_1-C_{10})$ alkyl, $(C_3-C_{10})$ cycloalkyl group, trifluoromethyl, alkoxy, cyano, dialkylamino, a solubilizing group, and $(C_1-C_{10})$ alkyl substituted by a solubilizing group;
m is 0-5;
n is 0-4;
$R_3$ is one of the following:
  (i) an aryl group (such as phenyl), the aryl group being optionally substituted by one or more substituents such as halogen, $(C_1-C_{10})$ alkyl group, trifluoromethyl, cyano and alkoxy;
  ii) a heteroaryl group (such as 2, 3, or 4-pyridyl group), the heteroaryl group being optionally substituted by one or more substituents such as halogen, $(C_1-C_{10})$ alkyl group, trifluoromethyl and alkoxy;
  (iii) a five-membered ring aromatic heterocyclic group (such as, for example, 2-thienyl, 3-thienyl, 2-thiazolyl, 4-thiazolyl, 5-thiazolyl), the aromatic heterocyclic group being optionally substituted by one or more substituents such as halogen, $(C_1-C_{10})$ alkyl group, trifluoromethyl, and alkoxy.

In one embodiment, $R_1$ and $R_2$ of formula (I) are selected independently from hydrogen, halogen, $(C_1-C_{10})$ alkyl, $(C_3-C_{10})$ cycloalkyl group, trifluoromethyl, alkoxy, cyano, dialkylamino, and a solubilizing group.

Thus, in one embodiment, the 2-aminoarylthiazole derivative of the invention, or a pharmaceutically acceptable salt or solvate thereof, is a 2-aminoarylthiazole derivative of formula (I) as described above, or a pharmaceutically acceptable salt or solvate thereof.

In one embodiment, the 2-aminoarylthiazole derivative of the invention has the following formula (II):

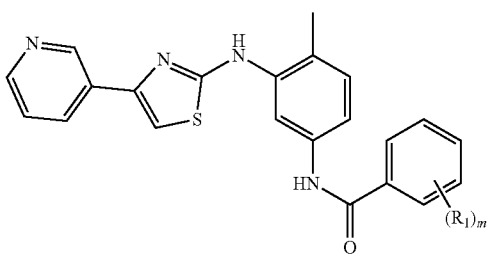

(II)

wherein:
$R_1$ is selected independently from hydrogen, halogen, $(C_1-C_{10})$ alkyl, $(C_3-C_{10})$ cycloalkyl group, trifluoromethyl, alkoxy, amino, alkylamino, dialkylamino, a solubilizing group, and $(C_1-C_{10})$ alkyl substituted by a solubilizing group; and
m is 0-5.

In one embodiment, $R_1$ of formula (I) is selected independently from hydrogen, halogen, $(C_1-C_{10})$ alkyl, $(C_3-C_{10})$ cycloalkyl group, trifluoromethyl, alkoxy, amino, alkylamino, dialkylamino, and a solubilizing group.

In one embodiment, $R_1$ of formula (I) is a solubilizing group. In one embodiment, $R_1$ of formula (I) is $(C_1-C_{10})$ alkyl substituted by a solubilizing group.

In one embodiment, $R_1$ of formula (I) is (C1-C10) alkyl-(C2-C11) heterocycloalkyl-(C1-C10) alkyl-. In one embodiment, $R_1$ of formula (I) is $(C_1-C_4)$ alkyl-$(C_2-C_{11})$ heterocycloalkyl-$(C_1-C_{10})$ alkyl-, preferably $(C_1-C_2)$ alkyl-$(C_2-C_{11})$ heterocycloalkyl-$(C_1-C_{10})$ alkyl-. In one embodiment, $R_1$ of formula (I) is $(C_1-C_{10})$ alkyl-$(C_2-C_{11})$ heterocycloalkyl-$(C_1-C_4)$ alkyl-, preferably $(C_1-C_{10})$ alkyl-$(C_2-C_{11})$ heterocycloalkyl-$(C_1-C_2)$ alkyl-. In one embodiment, $R_1$ of formula (I) is $(C_1-C_{10})$ alkyl-$(C_2-C_6)$ heterocycloalkyl-$(C_1-C_{10})$ alkyl-, preferably $(C_1-C_{10})$ alkyl-$(C_4)$ heterocycloalkyl-$(C_1-C_{10})$ alkyl-. In one embodiment, $R_1$ of formula (I) is $(C_1-C_4)$ alkyl-$(C_2-C_6)$ heterocycloalkyl-$(C_1-C_4)$ alkyl-, preferably $(C_1-C_2)$ alkyl-$(C_4)$ heterocycloalkyl-$(C_1-C_2)$ alkyl-. In one embodiment, $R_1$ of formula (I) is $(C_1-C_4)$ alkyl-piperazinyl-$(C_1-C_4)$ alkyl-, preferably $(C_1-C_2)$ alkyl-piperazinyl-$(C_1-C_2)$ alkyl-. In one embodiment, $R_1$ of formula (I) is methylpiperazinyl-$(C_1-C_2)$ alkyl-, preferably methylpiperazinyl-methyl-, more preferably 4-methylpiperazinyl-methyl-.

Thus, in one embodiment, the 2-aminoarylthiazole derivative of the invention, or a pharmaceutically acceptable salt or solvate thereof, is a 2-aminoarylthiazole derivative of formula (II) as described above, or a pharmaceutically acceptable salt or solvate thereof.

As used herein, the term "aryl group" refers to a polyunsaturated, aromatic hydrocarbyl group having a single aromatic ring (i.e., phenyl) or multiple aromatic rings fused together (e.g., naphtyl) or linked covalently, typically containing 5 to 12 atoms; preferably 6 to 10, wherein at least one ring is aromatic. The aromatic ring may optionally include one to two additional rings (either cycloalkyl, heterocyclyl or heteroaryl) fused thereto. Aryl is also intended to include the partially hydrogenated derivatives of the carbocyclic systems enumerated herein. Examples of suitable aryl groups include, without being limited to, phenyl, tolyl, anthracenyl, fluorenyl, indenyl, azulenyl, and naphthyl, as well as benzo-fused carbocyclic moieties such as 5,6,7,8-tetrahydronaphthyl.

An aryl group can be unsubstituted or substituted with one or more substituents. In one embodiment, the aryl group is a monocyclic ring, wherein the ring comprises 6 carbon atoms, referred to herein as "$(C_6)$ aryl".

As used herein, the term "alkyl group" refers to a saturated straight chain or branched non-cyclic hydrocarbon having from 1 to 10 carbon atoms, preferably from 1 to 6 carbon atoms. Representative saturated straight chain alkyls include, without being limited to, methyl, ethyl, n-propyl, n-butyl, n-pentyl, n-hexyl, n-heptyl, n-octyl, n-nonyl and n-decyl. Saturated branched alkyls include, without being limited to, isopropyl, sec-butyl, isobutyl, tert-butyl, isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethylhexyl, 2,4-dimethylhexyl, 2,5-dimethylhexyl, 2,2-dimethylpentyl, 2,2-dimethylhexyl, 3,3-dimtheylpentyl, 3,3-dimethylhexyl, 4,4-dimethylhexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, 3,3-diethylhexyl. Alkyl groups included in compounds of the present invention may be optionally substituted with one or more substituents.

As used herein, the term "alkoxy" refers to an alkyl group which is attached to another moiety by an oxygen atom. Examples of alkoxy groups include, without being limited to, methoxy, isopropoxy, ethoxy, tert-butoxy. Alkoxy groups may be optionally substituted with one or more substituents.

As used herein, the term "cycloalkyl" refers to a saturated cyclic alkyl radical having from 3 to 10 carbon atoms. Representative cycloalkyls include cyclopropyl, 1-methylcyclopropyl, cyclobutyl, cyclopentyl, cyclohexyl, cycloheptyl, cyclooctyl, cyclononyl, and cyclodecyl. Cycloalkyl groups can be optionally substituted with one or more substituents.

As used herein, the term "halogen" refers to —F, —Cl, —Br or —I.

As used herein, the term "heteroaryl" refers to a monocyclic or polycyclic heteroaromatic ring comprising carbon atom ring members and one or more heteroatom ring members (such as, for example, oxygen, sulfur or nitrogen). Typically, a heteroaryl group has from 1 to about 5 heteroatom ring members and from 1 to about 14 carbon atom ring members. Representative heteroaryl groups include, without being limited to, pyridyl, 1-oxo-pyridyl, furanyl, benzo[1,3]dioxolyl, benzo[1,4]dioxinyl, thienyl, pyrrolyl, oxazolyl, imidazolyl, thiazolyl, isoxazolyl, quinolinyl, pyrazolyl, isothiazolyl, pyridazinyl, pyrimidinyl, pyrazinyl, triazinyl, triazolyl, thiadiazolyl, isoquinolinyl, indazolyl, benzoxazolyl, benzofuryl, indolizinyl, imidazopyridyl, tetrazolyl, benzimidazolyl, benzothiazolyl, benzothiadiazolyl, benzoxadiazolyl, indolyl, tetrahydroindolyl, azaindolyl, imidazopyridyl, quinazolinyl, purinyl, pyrrolo[2,3]pyrimidinyl, pyrazolo[3,4]pyrimidinyl, imidazo[1,2-a]pyridyl, and benzo(b)thienyl. A heteroatom may be substituted with a protecting group known to those of ordinary skill in the art, for example, the hydrogen on a nitrogen may be substituted with a tert-butoxycarbonyl group. Heteroaryl groups may be optionally substituted with one or more substituents. In addition, nitrogen or sulfur heteroatom ring members may be oxidized. In one embodiment, the heteroaromatic ring is selected from 5-8 membered monocyclic heteroaryl rings. The point of attachment of a heteroaromatic or heteroaryl ring to another group may be at either a carbon atom or a heteroatom of the heteroaromatic or heteroaryl rings.

As used herein, the term "heterocycle" refers collectively to heterocycloalkyl groups and heteroaryl groups.

As used herein, the term "heterocycloalkyl" refers to a monocyclic or polycyclic group having at least one heteroatom selected from O, N or S, and which has 2-11 carbon atoms, which may be saturated or unsaturated, but is not aromatic. Examples of heterocycloalkyl groups include, without being limited to, piperidinyl, piperazinyl, 2-oxopiperazinyl, 2-oxopiperidinyl, 2-oxopyrrolidinyl, 4-piperidonyl, pyrrolidinyl, hydantoinyl, valerolactamyl, oxiranyl, oxetanyl, tetrahydropyranyl, tetrahydrothiopyranyl, tetrahydropyrindinyl, tetrahydropyrimidinyl, tetrahydrothiopyranyl sulfone, tetrahydrothiopyranyl sulfoxide, morpholinyl, thiomorpholinyl, thiomorpholinyl sulfoxide, thiomorpholinyl sulfone, 1,3-dioxolane, tetrahydrofuranyl, dihydrofuranyl-2-one, tetrahydrothienyl, and tetrahydro-1,1-dioxothienyl. Typically, monocyclic heterocycloalkyl groups have 3 to 7 members. Preferred 3 to 7 membered monocyclic heterocycloalkyl groups are those having 5 or 6 ring atoms. A heteroatom may be substituted with a protecting group known to those of ordinary skill in the art, for example, the hydrogen on a nitrogen may be substituted with a tert-butoxycarbonyl group. Furthermore, heterocycloalkyl groups may be optionally substituted with one or more substituents. In addition, the point of attachment of a heterocyclic ring to another group may be at either a carbon atom or a heteroatom of a heterocyclic ring. Only stable isomers of such substituted heterocyclic groups are contemplated in this definition.

As used herein, the term "substituent" or "substituted" means that a hydrogen radical on a compound or group is replaced with any desired group that is substantially stable to reaction conditions in an unprotected form or when protected using a protecting group. Examples of preferred substituents include, without being limited to, halogen (chloro, iodo, bromo, or fluoro); alkyl; alkenyl; alkynyl; hydroxy; alkoxy; nitro; thiol; thioether; imine; cyano; amido; phosphonato; phosphine; carboxyl; thiocarbonyl; sulfonyl; sulfonamide; ketone; aldehyde; ester; oxygen (—O); haloalkyl (e.g., trifluoromethyl); cycloalkyl, which may be monocyclic or fused or non-fused polycyclic (e.g., cyclopropyl, cyclobutyl, cyclopentyl, or cyclohexyl), or a heterocycloalkyl, which may be monocyclic or fused or non-fused polycyclic (e.g., pyrrolidinyl, piperidinyl, piperazinyl, morpholinyl, or thiazinyl), monocyclic or fused or non-fused polycyclic aryl or heteroaryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridyl, quinolinyl, isoquinolinyl, acridinyl, pyrazinyl, pyridazinyl, pyrimidinyl, benzimidazolyl, benzothiophenyl, or benzofuranyl); amino (primary, secondary, or tertiary); $CO_2CH_3$; $CONH_2$; $OCH_2CONH_2$; $NH_2$; $SO_2NH_2$; $OCHF_2$; $CF_3$; $OCF_3$; and such moieties may also be optionally substituted by a fused-ring structure or bridge, for example —$OCH_2O$—. These substituents may optionally be further substituted with a substituent selected from such groups. In certain embodiments, the term "substituent" or the adjective "substituted" refers to a substituent selected from the group consisting of an alkyl, an alkenyl, an alkynyl, an cycloalkyl, an cycloalkenyl, a heterocycloalkyl, an aryl, a heteroaryl, an arylalkyl, a heteroarylalkyl, a haloalkyl, —$C(O)NR_{11}R_{12}$, —$NR_{13}C(O)R_{14}$, a halo, —$OR_{13}$, cyano, nitro, a haloalkoxy, —$C(O)R_{13}$, —$NR_{11}R_{12}$, —$SR_{13}$, —$C(O)OR_{13}$, —$OC(O)R_{13}$, —$NR_{13}C(O)NR_{11}R_{12}$, —$OC(O)NR_{11}R_{12}$, —$NR_{13}C(O)OR_{14}$, —$S(O)rR_{13}$, —$NR_{13}S(O)rR_{14}$, —$OS(O)rR_{14}$, $S(O)rNR_{11}R_{12}$, —O, —S, and —$N$—$R_{13}$, wherein r is 1 or 2; $R_{11}$ and $R_{12}$, for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocycloalkyl, an optionally substituted aryl, an optionally substituted heteroaryl, an optionally substituted arylalkyl, or an optionally substituted heteroarylalkyl; or $R_{11}$ and $R_{12}$ taken together with the nitrogen to which they are attached is optionally substituted heterocycloalkyl or optionally substituted heteroaryl; and $R_{13}$ and $R_{14}$ for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocycloalkyl, an optionally substituted aryl, an optionally substituted heteroaryl, an optionally substituted arylalkyl, or an optionally substituted heteroarylalkyl. In certain embodiments, the term "substituent" or the adjective "substituted" refers to a solubilizing group.

As used herein, the term "solubilizing group" refers to any group which can be substantially ionized and that enables the compound to be soluble in a desired solvent, such as, for example, water or water-containing solvent ("water-solubilizing group"). Furthermore, the solubilizing group can be one that increases the compound or complex's lipophilicity. In one embodiment, the solubilizing group is selected from alkyl group substituted with one or more heteroatoms such as N, O, S, each optionally substituted with alkyl group substituted independently with alkoxy, amino, alkylamino, dialkylamino, carboxyl, cyano, or substituted with cycloheteroalkyl or heteroaryl, or a phosphate, or a sulfate, or a carboxylic acid. In one embodiment, the solubilizing group is one of the following:

- an alkyl, cycloalkyl, aryl, heteroaryl group comprising either at least one nitrogen or oxygen heteroatom and/or which group is substituted by at least one amino group or oxo group (including, without being limited to, 2-oxopiperazinyl, 2-oxopiperidinyl, 2-oxopyrrolidinyl, 4-piperidonyl, hydantoinyl, valerolactamyl, oxiranyl, oxetanyl, tetrahydropyranyl, morpholinyl, 1,3-dioxolane, tetrahydrofuranyl and dihydrofuranyl-2-one);
- an amino group which may be a saturated cyclic amino group (including, without being limited to, piperidinyl, piperazinyl and pyrrolidinyl) which may be substituted by a group consisting of alkyl, alkoxycarbonyl, halogen, haloalkyl, hydroxyalkyl, amino, monoalkylamino, dialkylamino, carbamoyl, monoalkylcarbamoyl and dialkylcarbamoyl (including, without being limited to, methyl-piperidinyl, methyl-piperazinyl and methyl-pyrrolidinyl);
- one of the structures a) to i) shown below, wherein the wavy line and the arrow line correspond to the point of attachment to the core structure of the 2-aminoarylthiazole derivative of the invention, for example of formula (I) or (II):

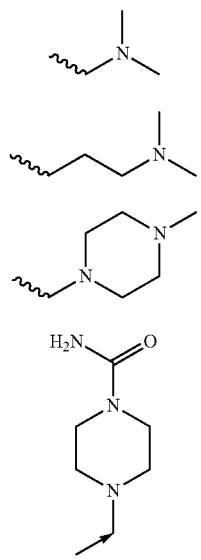

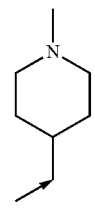

e

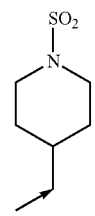

f

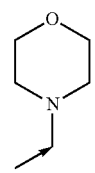

g

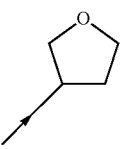

h

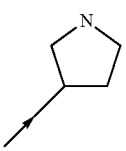

i

In one embodiment, the solubilizing group is one of the following:
- an alkyl, cycloalkyl, aryl, heteroaryl group comprising either at least one nitrogen or oxygen heteroatom or which group is substituted by at least one amino group or oxo group;
- an amino group which may be a saturated cyclic amino group which may be substituted by a group consisting of alkyl, alkoxycarbonyl, halogen, haloalkyl, hydroxyalkyl, amino, monoalkylamino, dialkylamino, carbamoyl, monoalkylcarbamoyl and dialkylcarbamoyl;
- one of the structures a) to i) shown above, wherein the wavy line and the arrow line correspond to the point of attachment to the core structure of the 2-aminoarylthiazole derivative of the invention, for example of formula (I) or (II).

In one embodiment, the solubilizing group is a saturated cyclic amino group (including, without being limited to, piperidinyl, piperazinyl and pyrrolidinyl) which may be substituted by a group consisting of alkyl, alkoxycarbonyl, halogen, haloalkyl, hydroxyalkyl, amino, monoalkylamino, dialkylamino, carbamoyl, monoalkylcarbamoyl and dialkylcarbamoyl (including, without being limited to, methyl-piperidinyl, methyl-piperazinyl and methyl-pyrrolidinyl).

In one embodiment, the solubilizing group is structure c) shown above, wherein the wavy line corresponds to the point of attachment to the core structure of the 2-aminoarylthiazole derivative of the invention, for example of formula (I) or (II).

As used herein, "pharmaceutically acceptable salt" refers to a salt of a free acid or a free base which is not biologically undesirable and is generally prepared by reacting the free base with a suitable organic or inorganic acid or by reacting the free acid with a suitable organic or inorganic base. Suitable acid addition salts are formed from acids that form non-toxic salts. Examples include the acetate, adipate, aspartate, benzoate, besylate, bicarbonate/carbonate, bisulphate/sulphate, borate, camsylate, citrate, cyclamate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2 napsylate, nicotinate, nitrate, orotate, oxalate, palmitate, pamoate, phosphate/hydrogen, phosphate/dihydrogen, phosphate, pyroglutamate, saccharate, stearate, succinate, tannate, tartrate, tosylate, trifluoroacetate and xinofoate salts. Suitable base salts are formed from bases that form non-toxic salts. Examples include the aluminium, arginine, benzathine, calcium, choline, diethylamine, diolamine, glycine, lysine, magnesium, meglumine, olamine, potassium, sodium, tromethamine, 2 (diethylamino)ethanol, ethanolamine, morpholine, 4 (2 hydroxyethyl) morpholine and zinc salts. Hemi salts of acids and bases may also be formed, e.g., hemi sulphate and hemi calcium salts.

In one embodiment, pharmaceutically acceptable salts are pharmaceutically acceptable acid addition salts, for example with inorganic acids, such as hydrochloric acid, sulfuric acid or a phosphoric acid, or with suitable organic carboxylic or sulfonic acids, for example aliphatic mono- or di-carboxylic acids, such as trifluoroacetic acid, acetic acid, propionic acid, glycolic acid, succinic acid, maleic acid, fumaric acid, hydroxymaleic acid, malic acid, tartaric acid, citric acid or oxalic acid, or amino acids such as arginine or lysine, aromatic carboxylic acids, such as benzoic acid, 2-phenoxy-benzoic acid, 2-acetoxy-benzoic acid, salicylic acid, 4-aminosalicylic acid, aromatic-aliphatic carboxylic acids, such as mandelic acid or cinnamic acid, heteroaromatic carboxylic acids, such as nicotinic acid or isonicotinic acid, aliphatic sulfonic acids, such as methane-, ethane- or 2-hydroxy-ethane-sulfonic, in particular methanesulfonic acid, or aromatic sulfonic acids, for example benzene-, p-toluene- or naphthalene-2-sulfonic acid.

In one embodiment, the pharmaceutically acceptable salt of the 2-aminoarylthiazole derivative of the invention is mesilate.

Unless otherwise indicated, the term "mesilate" is used herein to refer to a salt of methanesulfonic acid with a named pharmaceutical substance (such as 2-aminoarylthiazole derivatives of formula (I) or (II)). Use of "mesilate" rather than "mesylate" is in compliance with the INNM (International nonproprietary names modified) issued by WHO (e.g., World Health Organization (February 2006). International Nonproprietary Names Modified. INN Working Document 05.167/3. WHO).

As used herein, "pharmaceutically acceptable solvate" refers to a molecular complex comprising the 2-aminoarylthiazole derivative of the invention and stoichiometric or sub-stoichiometric amounts of one or more pharmaceutically acceptable solvent molecules such as ethanol. The term 'hydrate' refers to when said solvent is water.

In one embodiment, the 2-aminoarylthiazole derivative of the invention or a pharmaceutically acceptable salt or solvate thereof is masitinib or a pharmaceutically acceptable salt or solvate thereof.

The chemical name for masitinib is 4-(4-methylpiperazin-1-ylmethyl)-N-[4-methyl-3-(4-pyridin-3ylthiazol-2-ylamino) phenyl]benzamide—CAS number 790299-79-5:

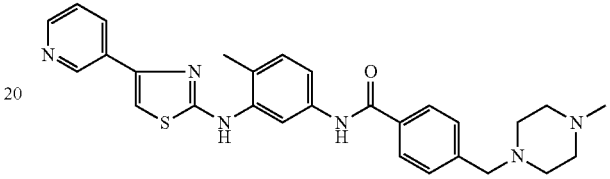

Masitinib was first described in U.S. Pat. No. 7,423,055 and EP 1 525 200 B1.

In one embodiment, the 2-aminoarylthiazole derivative of the invention or a pharmaceutically acceptable salt or solvate thereof is masitinib mesilate. Thus, in one embodiment, the pharmaceutically acceptable salt of masitinib as described hereinabove is masitinib mesilate. As mentioned hereinabove, in other words, the pharmaceutically acceptable salt of masitinib is the methanesulfonic acid salt of masitinib.

A detailed procedure for the synthesis of masitinib mesilate is given in WO 2008/098949.

In one embodiment, "masitinib mesilate" refers to the orally bioavailable mesilate salt of masitinib—CAS 1048007-93-7 (MsOH); $C_{28}H_{30}N_6OS \cdot CH_3SO_3H$; MW 594.76:

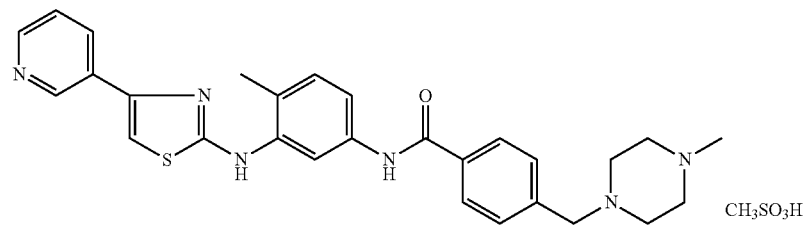

According to one embodiment, the 2-aminoarylthiazole derivative as described hereinabove, preferably masitinib, or a pharmaceutically acceptable salt or solvate thereof, is to be administered at a therapeutically effective dose.

In one embodiment, the 2-aminoarylthiazole derivative as described hereinabove, preferably masitinib, or a pharmaceutically acceptable salt or solvate thereof, is to be administered at a dose ranging from about 1.0 to about 12.0 mg/kg/day (mg per kilo body weight per day). In one embodiment, the 2-aminoarylthiazole derivative as described hereinabove, preferably masitinib, or a pharmaceutically acceptable salt or solvate thereof, is to be administered at a dose ranging from about 1.5 to about 7.5 mg/kg/day. In one embodiment, the 2-aminoarylthiazole derivative as described hereinabove, preferably masitinib, or a pharmaceutically acceptable salt or solvate thereof, is to be administered at a dose ranging from about 3.0 to about 12.0 mg/kg/day.

In one embodiment, the 2-aminoarylthiazole derivative as described hereinabove, preferably masitinib, or a pharmaceutically acceptable salt or solvate thereof, is to be administered at a dose of about 1.0, 2.0, 3.0, 4.0, 5.0, 6.0, 7.0, 8.0, 9.0, 10.0, 11.0 or 12.0 mg/kg/day. In one embodiment, the 2-aminoarylthiazole derivative, preferably masitinib, or a pharmaceutically acceptable salt or solvate thereof, is to be administered at a dose of about 1.5, 3.0, 4.5, 6.0, 7.5, 9.0, 10.5 or 12.0 mg/kg/day.

In one embodiment, the 2-aminoarylthiazole derivative as described hereinabove, preferably masitinib, or a pharmaceutically acceptable salt or solvate thereof, is to be administered at a dose of about 3.0, 4.5 or 6.0 mg/kg/day, preferably at a dose of about 3.0 mg/kg/day or of about 4.5 mg/kg/day.

In one embodiment, the 2-aminoarylthiazole derivative as described hereinabove, preferably masitinib, or a pharmaceutically acceptable salt or solvate thereof, can be dose escalated by increments of about 1.5 mg/kg/day to reach a maximum of about 7.5 mg/kg/day, more preferably of about 4.5 or about 6.0 mg/kg/day. Each dose escalation is subjected to toxicity controls with an absence of any toxicity events permitting dose escalation to occur.

In one embodiment, the dose escalation of the 2-aminoarylthiazole derivative, or a pharmaceutically acceptable salt or solvate thereof, occurs at any time-point after at least 4 weeks after the administration of the initial dose and prior to 26 weeks after the administration of the initial dose; for example, at 4 weeks, 8 weeks, 12 weeks, 16 weeks, 20 weeks, or 24 weeks after the administration of the initial dose. Each dose escalation is subjected to toxicity controls, including but not limited to: previous 4-week treatment period at a constant dose of study treatment and no suspected severe adverse event was reported and no suspected adverse event led to treatment interruption and no suspected adverse event is ongoing at the time of the dose increase, regardless of its severity.

In one embodiment, the 2-aminoarylthiazole derivative as described hereinabove, preferably masitinib, or a pharmaceutically acceptable salt or solvate thereof, is to be administered at an initial dose of about 3.0 mg/kg/day during 6 weeks, then at a dose of about 4.5 mg/kg/day thereafter. In another embodiment, the 2-aminoarylthiazole derivative as described hereinabove, preferably masitinib, or a pharmaceutically acceptable salt or solvate thereof, is to be administered at an initial dose of about 3.0 mg/kg/day during 12 weeks, then at a dose of about 4.5 mg/kg/day thereafter.

In one embodiment, the 2-aminoarylthiazole derivative as described hereinabove, preferably masitinib, or a pharmaceutically acceptable salt or solvate thereof, is to be administered at an initial dose of about 3.0 mg/kg/day during at least 4 weeks, then at a dose of about 4.5 mg/kg/day during at least 4 weeks, and at a dose of about 6.0 mg/kg/day thereafter, with each dose escalation being subjected to toxicity controls. In another embodiment, the 2-aminoarylthiazole derivative as described hereinabove, preferably masitinib, or a pharmaceutically acceptable salt or solvate thereof, is to be administered at an initial dose of about 4.5 mg/kg/day during at least 6 weeks, and at a dose of about 6.0 mg/kg/day thereafter, with each dose escalation being subjected to toxicity controls.

According to one embodiment, any dose indicated herein refers to the amount of active ingredient as such, not to its pharmaceutically acceptable salt or solvate form. Thus, compositional variations of a pharmaceutically acceptable salt or solvate of the 2-aminoarylthiazole derivative of the invention, in particular masitinib, will not impact the dose to be administered.

According to one embodiment, the 2-aminoarylthiazole derivative as described hereinabove, preferably masitinib, or a pharmaceutically acceptable salt or solvate thereof, may be administered orally, intravenously, parenterally, topically, by inhalation spray, rectally, nasally, or buccally.

In one embodiment, the 2-aminoarylthiazole derivative as described hereinabove, preferably masitinib, or a pharmaceutically acceptable salt or solvate thereof, is to be administered orally.

In one embodiment, the 2-aminoarylthiazole derivative as described hereinabove, preferably masitinib, or a pharmaceutically acceptable salt or solvate thereof, is to be administered at least once a day, preferably twice a day.

In one embodiment, the 2-aminoarylthiazole derivative as described hereinabove, preferably masitinib, or a pharmaceutically acceptable salt or solvate thereof, is to be administered for a prolonged period, such as for example, for at least 1, 2, 3, 6, 9, or 12 months.

In one embodiment, the 2-aminoarylthiazole derivative as described hereinabove, preferably masitinib, or a pharmaceutically acceptable salt or solvate thereof, is in a form adapted for oral administration.

Examples of forms adapted for oral administration include, without being limited to, liquid, paste or solid compositions, and more particularly tablets, pills, capsules, liquids, gels, syrups, slurries, and suspensions.

In one embodiment, the 2-aminoarylthiazole derivative as described hereinabove, preferably masitinib, or a pharmaceutically acceptable salt or solvate thereof, is to be administered as tablets, preferably as 100 mg or 200 mg tablets.

According to one embodiment, the 2-aminoarylthiazole derivative as described hereinabove, preferably masitinib, or a pharmaceutically acceptable salt or solvate thereof, is to be administered with at least one further pharmaceutically active agent.

According to the present invention, the 2-aminoarylthiazole derivative as described hereinabove, preferably masitinib, or a pharmaceutically acceptable salt or solvate thereof, may be administered simultaneously, separately or sequentially with said at least one further pharmaceutically active agent.

In one embodiment, the 2-aminoarylthiazole derivative as described hereinabove, preferably masitinib, or a pharmaceutically acceptable salt or solvate thereof, is to be administered in combination with said at least one further pharmaceutically active agent, preferably in a combined preparation, pharmaceutical composition or medicament.

Examples of further pharmaceutically active agents that may be administered to a SCD patient as defined in the present invention include, without being limited to, hydroxyurea (also known as hydroxycarbamide), erythropoietin, L-glutamine, crizanlizumab, rivipansel, ticagrelor, defibrotide, SC411, and voxelotor. Thus, in one embodiment, the at least one further pharmaceutically active agent is selected from the group comprising or consisting of hydroxyurea (also known as hydroxycarbamide), erythropoietin, L-glutamine, crizanlizumab, rivipansel, ticagrelor, defibrotide, SC411, and voxelotor.

In one embodiment, the at least one further pharmaceutically active agent is selected from the group consisting of hydroxyurea (also known as hydroxycarbamide), erythropoietin, L-glutamine, and crizanlizumab.

In one embodiment, the at least one further pharmaceutically active agent is hydroxyurea (also known as hydroxycarbamide) and/or erythropoietin.

In one embodiment, the at least one further pharmaceutically active agent is hydroxyurea. Hydroxyurea may be administered orally, for example at a dose ranging from about 10 mg/kg/day to about 35 mg/kg/day, preferably at a dose ranging from about 10 mg/kg/day to about 25 mg/kg/day.

In one embodiment, the at least one further pharmaceutically active agent is erythropoietin (also referred to as EPO). Erythropoietin may be administered by intravenous injection, for example once, twice or three times per week over 1, 2, 3, 4, 5, 6, 7, 8, 9 month(s) or more. Erythropoietin may be injected at a dose ranging from about 100 U/kg to about 3000 U/kg, preferably at a dose ranging from about 400 U/kg to about 1500 U/kg.

Another object of the present invention is a method for treating sickle cell disease as describe hereinabove in a patient in need thereof, comprising administering to the patient a 2-aminoarylthiazole derivative or a pharmaceutically acceptable salt or solvate thereof as described hereinabove.

In one embodiment, the method of the invention comprises administering to the patient a therapeutically effective dose as described hereinabove of the 2-aminoarylthiazole derivative, or a pharmaceutically acceptable salt or solvate thereof, of the invention. In one embodiment, the method of the invention comprises administering to the patient a therapeutically effective dose as described hereinabove of a 2-aminoarylthiazole derivative of formula (II) as described hereinabove, or a pharmaceutically acceptable salt or solvate thereof. In one embodiment, the method of the invention comprises administering to the patient a therapeutically effective dose as described hereinabove of masitinib, or a pharmaceutically acceptable salt or solvate thereof. In one embodiment, the method of the invention comprises administering to the patient at least one further pharmaceutically active agent as described hereinabove.

In one embodiment, the method of the invention is for preventing and/or treating a vaso-occlusive crisis (VOC) and/or acute chest syndrome (ACS) in a SCD patient in need thereof. In one embodiment, the method of the invention is for preventing and/or treating a VOC in a SCD patient in need thereof. In one embodiment, the method of the invention is for preventing and/or treating ACS in a SCD patient in need thereof. In one embodiment, the method of the invention is for preventing and/or treating ACS unrelated to a vaso-occlusive crisis (VOC) in a SCD patient in need thereof. In one embodiment, the method of the invention is for preventing and/or treating ACS unrelated to any other manifestation or complication of sickle cell disease.

Another object of the present invention is a pharmaceutical composition comprising a 2-aminoarylthiazole derivative as described hereinabove, in particular masitinib, or a pharmaceutically acceptable salt or solvate thereof, and at least one pharmaceutically acceptable excipient, for use in the treatment of sickle cell disease as describe hereinabove in a patient in need thereof. Another object of the present invention is a pharmaceutical composition for use in the treatment of sickle cell disease as describe hereinabove in a patient in need thereof, said pharmaceutical composition comprising a 2-aminoarylthiazole derivative as described hereinabove, in particular masitinib, or a pharmaceutically acceptable salt or solvate thereof, and at least one pharmaceutically acceptable excipient.

In one embodiment, the pharmaceutical composition of the invention is for use in the prevention and/or treatment of a vaso-occlusive crisis (VOC) and/or acute chest syndrome (ACS) in a SCD patient in need thereof. In one embodiment, the pharmaceutical composition of the invention is for use in the prevention and/or treatment of a VOC in a SCD patient in need thereof. In one embodiment, the pharmaceutical composition of the invention is for use in the prevention and/or treatment of ACS in a SCD patient in need thereof. In one embodiment, the pharmaceutical composition of the invention is for use in the prevention and/or treatment of ACS unrelated to a vaso-occlusive crisis (VOC) in a SCD patient in need thereof. In one embodiment, the pharmaceutical composition of the invention is for use in the prevention and/or treatment of ACS unrelated to any other manifestation or complication of sickle cell disease.

In one embodiment, the pharmaceutical composition of the invention is for use in combination with at least one further pharmaceutically active agent as described hereinabove.

Another object of the present invention is a pharmaceutical composition comprising a 2-aminoarylthiazole derivative as described hereinabove, in particular masitinib, or a pharmaceutically acceptable salt or solvate thereof, and at least one pharmaceutically acceptable excipient for the treatment of sickle cell disease as describe hereinabove in a patient in need thereof. Another object of the present invention is a pharmaceutical composition for the treatment of sickle cell disease as describe hereinabove in a patient in need thereof, said pharmaceutical composition comprising a 2-aminoarylthiazole derivative as described hereinabove, in particular masitinib, or a pharmaceutically acceptable salt or solvate thereof, and at least one pharmaceutically acceptable excipient.

In one embodiment, the present invention relates to a pharmaceutical composition comprising a 2-aminoarylthiazole derivative as described hereinabove, in particular masitinib, or a pharmaceutically acceptable salt or solvate thereof, and at least one pharmaceutically acceptable excipient, in combination with at least one further pharmaceutically active agent as described hereinabove, for the treatment of sickle cell disease as describe hereinabove in a patient in need thereof Another object of the present invention is the use of a 2-aminoarylthiazole derivative as described hereinabove, in particular masitinib, or a pharmaceutically acceptable salt or solvate thereof, for the manufacture of a medicament for the treatment of sickle cell disease as describe hereinabove in a patient in need thereof.

In one embodiment, the present invention relates to the use of a 2-aminoarylthiazole derivative as described hereinabove, in particular masitinib, or a pharmaceutically acceptable salt or solvate thereof, for the manufacture of a medicament for the treatment of sickle cell disease as describe hereinabove in a patient in need thereof in combination with at least one further pharmaceutically active agent as described hereinabove.

In one embodiment, the present invention relates to the use of a 2-aminoarylthiazole derivative as described hereinabove, in particular masitinib, or a pharmaceutically acceptable salt or solvate thereof, in combination with at least one further pharmaceutically active agent as described hereinabove, for the manufacture of a medicament for the treatment of sickle cell disease as describe hereinabove in a patient in need thereof.

In one embodiment, the pharmaceutical composition or the medicament of the invention is for the prevention and/or treatment of a vaso-occlusive crisis (VOC) and/or acute chest syndrome (ACS) in a SCD patient in need thereof. In one embodiment, the pharmaceutical composition or the medicament of the invention is for the prevention and/or treatment of a VOC in a SCD patient in need thereof. In one embodiment, the pharmaceutical composition or the medicament of the invention is for the prevention and/or treatment of ACS in a SCD patient in need thereof. In one embodiment, the pharmaceutical composition or the medicament of the invention is for the prevention and/or treatment of ACS unrelated to a vaso-occlusive crisis (VOC) in a SCD patient in need thereof. In one embodiment, the pharmaceutical composition or the medicament of the invention is for the prevention and/or treatment of ACS unrelated to any other manifestation or complication of sickle cell disease.

EXAMPLES

The present invention is further illustrated by the following examples.

Example 1

Materials and Methods
Material
Mice

The Townes transgenic mouse model was utilized for this study (Wu L C et al., Blood 2006; 108:1183-1188). A total of 18 mice were assigned to 3 treatment groups; namely: SCD (HbSS mice) treated with masitinib (SCD Masitinib—intervention group), untreated SCD mice (SCD—positive control group), and WT mice (WT—negative control group).

The HbSS-Townes mouse model was created on a mixed genetic background in which the murine adult α-globin genes were replaced with the human α-globin gene (genotype: Hba hα/hα) and the murine adult β-globin genes were replaced with human sickle βS- and fetal Aγ-globin gene fragments linked together (genotype: Hbb hAγβS/hAγβS) (Nguyen J, et al., Blood 2014; 124(21):4916). HbSS-Townes mice have anemia, a shortened red blood cell half-life of 2.5 days and a severe disease phenotype. Control HbAA-Townes mice were created by replacing the murine globin genes with human α-globin gene (genotype: Hba hα/hα) and linked human βA- and fetal Aγ-globins (genotype: Hbb hAγβA/hAγβA).

Reagents

Mice were administered freshly prepared solutions of substance P (4 to 40 mg/kg) via intravenous injection.

Mice in the intervention group were administered masitinib at 100 mg/kg/day via gavage for 4 days prior to injection of substance P.

Methods
SCD Mice Model

Townes transgenic sickle mice were characterized genetically by qPCR. All mice used in the experiments were 12- to 14-week old and were pathogen free.

Immunostaining

Lung tissue was processed immediately after death by cervical dislocation and fixed in 10% buffered formalin. For analysis of the lung tissue cellular structure, samples were stained with hematoxylin and eosin. For analysis of mast cell infiltration, samples were stained with an anti-FcεRIα primary antibody and a fluorophore secondary antibody.

Results

Vaso-occlusive crisis (VOC) occurrence and overall survival were analyzed in the mice. After injection of substance P, all mice from the untreated SCD group (positive control group) experienced VOC and 83% died in the first 3 hours. In stark contrast, SCD mice pretreated with masitinib did not present any VOC and none died (FIG. 1).

The cause of death was then analyzed. Lungs were processed immediately after death by cervical dislocation and were fixed in 10% buffered formalin. Lung tissue sections were stained with hematoxylin and eosin. For immunofluorescence, lung tissue sections were incubated with an anti-FcεRIα primary antibody and then stained with a fluorophore secondary antibody. As shown in FIGS. 2A to 2H, the lung tissue of SCD mice treated with masitinib (FIGS. 2D and 2H) was infiltrated by FcεRI-positive cells (i.e., mast cells) to a far lesser degree than untreated SCD mice (positive control) (FIGS. 2B-C and 2F-G), and edema was also reduced.

The limited infiltration of the lung tissue of SCD mice treated with masitinib by FcεRI-positive cells and the absence or limited edema demonstrate that said SCD mice treated with masitinib did not develop ACS.

These results show that the treatment of SCD mice with masitinib results in an eradication of VOC, a complete absence of ACS and of SCD-related death, with a reduction in mast cell infiltration of the lung.

Example 2

A phase 2 clinical trial of masitinib in SCD patients is initiated, wherein masitinib or a placebo is administered orally to human SCD patients at a dose of 3 mg/kg/day, 4.5 mg/kg/day or 6 mg/kg/day.

The SCD patients to receive masitinib are SS or Sβ⁰ sickle cell disease patients and may be receiving treatment with hydroxyurea, erythropoietin and/or chronic transfusion.

The phase 2 clinical trial is designed as a multicenter, randomized, double-blind, placebo-controlled, 2-parallel groups clinical trial.

The invention claimed is:
1. A method for treating sickle cell disease (SCD) in a patient in need thereof, comprising administering to the patient a 2-aminoarylthiazole derivative of formula (II):

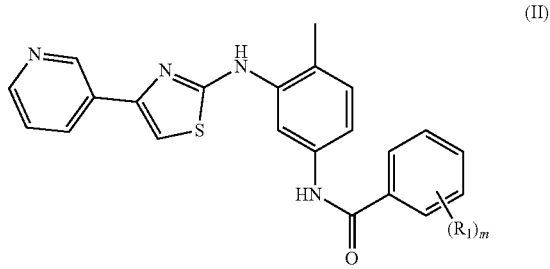

(II)

wherein:
$R_1$ is selected independently from hydrogen, halogen, ($C_1$-$C_{10}$) alkyl, ($C_3$-$C_{10}$) cycloalkyl group, trifluoromethyl, alkoxy, amino, alkylamino, dialkylamino, a solubilizing group, and ($C_1$-$C_{10}$) alkyl substituted by a solubilizing group; and
m is 0-5,
or a pharmaceutically acceptable salt or solvate thereof.

2. The method according to claim 1, wherein the 2-aminoarylthiazole derivative of formula (II), or a pharmaceutically acceptable salt or solvate thereof, is masitinib or a pharmaceutically acceptable salt or solvate thereof.

3. The method according to claim 2, wherein the pharmaceutically acceptable salt of masitinib is masitinib mesilate.

4. The method according to claim 1, wherein the sickle cell disease is hemoglobin SS or hemoglobin $S\beta^0$ disease.

5. The method according to claim 1, wherein the patient is a SCD patient with an increased risk of developing acute chest syndrome (ACS).

6. The method according to claim 5, wherein the SCD patient with an increased risk of developing ACS is a SCD patient with at least one of the following: asthma, pulmonary hypertension, bronchial hyperreactivity, atopy, respiratory infection, reactive airway disease, exposure to morphine, active smoking, and/or chronic passive smoking (also referred to as environmental exposure smoking).

7. The method according to claim 1, wherein the method is for the prevention and/or treatment of a sickle cell crisis (SCC), a vaso-occlusive crisis (VOC), and/or acute chest syndrome (ACS) in a SCD patient in need thereof.

8. The method according to claim 1, wherein the method is for the prevention and/or treatment of acute chest syndrome (ACS) in a SCD patient in need thereof.

9. The method according to claim 8, wherein ACS is unrelated to any other manifestation or complication of sickle cell disease.

10. The method according to claim 1, wherein the 2-aminoarylthiazole derivative of formula (II), or a pharmaceutically acceptable salt or solvate thereof, is administered orally.

11. The method according to claim 1, wherein the 2-aminoarylthiazole derivative of formula (II), or a pharmaceutically acceptable salt or solvate thereof, is administered at a dose ranging from about 1 mg/kg/day to about 12 mg/kg/day.

12. The method according to claim 1, wherein the 2-aminoarylthiazole derivative of formula (II), or a pharmaceutically acceptable salt or solvate thereof, is administered at a dose of about 3 mg/kg/day, 4.5 mg/kg/day, or 6 mg/kg/day.

13. The method according to claim 1, wherein the 2-aminoarylthiazole derivative of formula (II), or a pharmaceutically acceptable salt or solvate thereof, is administered at an initial dose of about 3.0 mg/kg/day during at least 4 weeks, then at a dose of about 4.5 mg/kg/day during at least 4 weeks, and at a dose of about 6.0 mg/kg/day thereafter, with each dose escalation being subjected to toxicity controls.

14. The method according to claim 1, wherein the 2-aminoarylthiazole derivative of formula (II), or a pharmaceutically acceptable salt or solvate thereof, is administered with at least one further pharmaceutically active agent.

15. The method according to claim 14, wherein the at least one further pharmaceutically active agent is selected from the group consisting of hydroxyurea, erythropoietin, L-glutamine, crizanlizumab, rivipansel, ticagrelor, defibrotide, SC411, and voxelotor.

16. The method according to claim 14, wherein the at least one further pharmaceutically active agent is selected from the group consisting of hydroxyurea, erythropoietin, L-glutamine, and crizanlizumab.

17. The method according to claim 14, wherein the at least one further pharmaceutically active agent is hydroxyurea or erythropoietin.

* * * * *